(12) United States Patent
Bleicher et al.

(10) Patent No.: US 11,977,950 B2
(45) Date of Patent: May 7, 2024

(54) OPTOELECTRONIC SENSOR HAVING AN AIMING DEVICE AND METHOD OF VISUALIZING A FIELD OF VIEW

(71) Applicant: SICK AG, Waldkirch (DE)

(72) Inventors: Katharina Bleicher, Waldkirch (DE); Christoph Menzel, Waldkirch (DE)

(73) Assignee: SICK AG, Waldkirch (DE)

( * ) Notice: Subject to any disclaimer, the term of this patent is extended or adjusted under 35 U.S.C. 154(b) by 0 days.

(21) Appl. No.: 18/083,688

(22) Filed: Dec. 19, 2022

(65) Prior Publication Data

US 2023/0316017 A1      Oct. 5, 2023

(30) Foreign Application Priority Data

Mar. 30, 2022   (EP) ..................................... 22165310

(51) Int. Cl.

| | |
|---|---|
| *G06K 7/10* | (2006.01) |
| *B82Y 20/00* | (2011.01) |
| *G02B 1/00* | (2006.01) |
| *G06K 7/14* | (2006.01) |

(52) U.S. Cl.
CPC ....... *G06K 7/10722* (2013.01); *G06K 7/1413* (2013.01)

(58) Field of Classification Search
CPC .......... G06K 7/10722; G06K 7/10831; B82Y 20/00; G02B 1/002; G03B 13/04
USPC ..................................................... 235/462.2
See application file for complete search history.

(56) References Cited

U.S. PATENT DOCUMENTS

| | | | |
|---|---|---|---|
| 10,002,215 B2 * | 6/2018 | Dowski | ............. H01L 27/14687 |
| 2006/0000911 A1 | 1/2006 | Stekel | |
| 2020/0134273 A1 * | 4/2020 | Wittenberg | ............ H04N 23/51 |

FOREIGN PATENT DOCUMENTS

| | | |
|---|---|---|
| DE | 102005040056 A1 | 3/2006 |
| DE | 202015100438 U1 | 6/2016 |
| DE | 102015115016 A1 | 3/2017 |
| DE | 102021130334 A1 | 5/2023 |
| EP | 2136248 A1 | 12/2009 |
| EP | 3205972 A1 | 8/2017 |
| WO | 2017053309 A1 | 3/2017 |

OTHER PUBLICATIONS

European Search Report dated Aug. 23, 2022 corresponding to application No. 22165310.8-1020.

(Continued)

*Primary Examiner* — Toan C Ly
(74) *Attorney, Agent, or Firm* — Nath, Goldberg & Meyer; Jerald L. Meyer

(57) ABSTRACT

An optoelectronic sensor is provided that has an image sensor for the detection of image data in its field of view and an aiming device having a light source that is arranged laterally offset from the image sensor and that is configured to generate alignment light and thus a light pattern in the field of view to make the position and/or extent of the field of view in space visible. In this respect, the aiming device has at least one optical metaelement having a metasurface and/or a metamaterial that is arranged and configured such that the optical axes of the image sensor and the aiming device are coaxially superposed.

19 Claims, 3 Drawing Sheets

(56) References Cited

OTHER PUBLICATIONS

Figure 1:
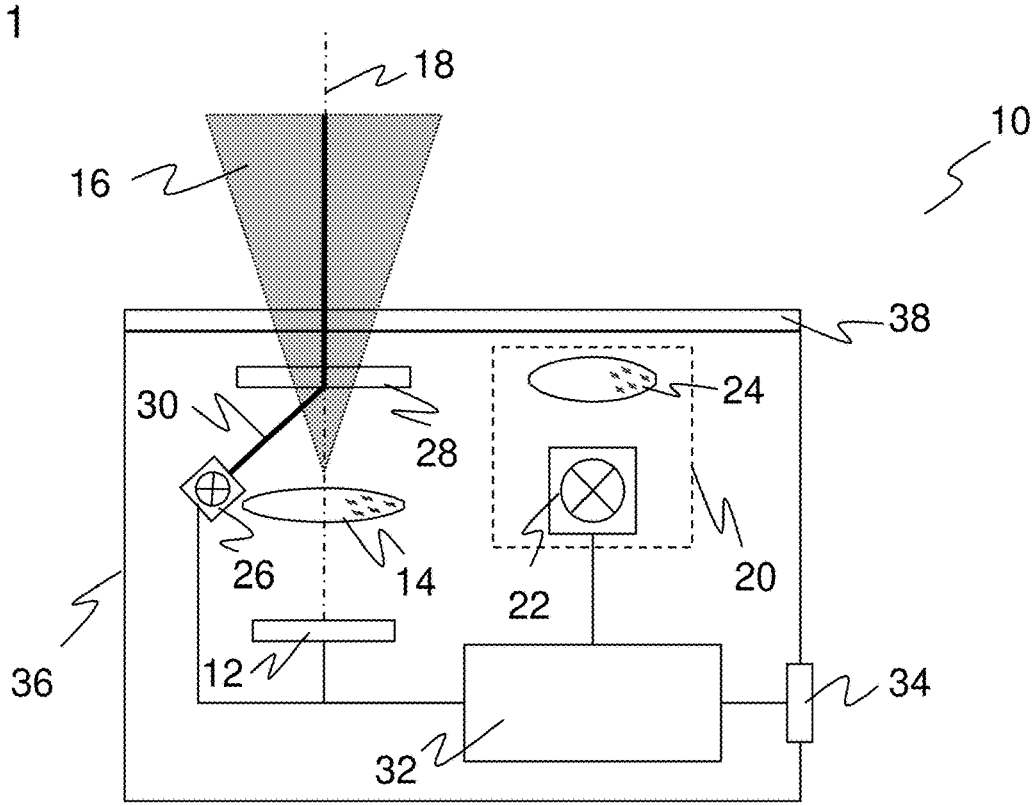

Reshef, Orad, et al. "An optic to replace space and its application towards ultra-thin imaging systems"; Nature Communications; 2021; 12:3512; https://doi.org/10.1038/s41467-021-23358-8; www.nature.com/naturecommunications.

Yu, Nanfang, et al. "Flat optics with designer metasurfaces"; Nature Materials Review Article; Published Online Jan. 23, 2014.

* cited by examiner

OPTOELECTRONIC SENSOR HAVING AN AIMING DEVICE AND METHOD OF VISUALIZING A FIELD OF VIEW

The invention relates to an optoelectronic sensor, in particular to a camera, having an aiming device and to a method of visualizing a field of view of an optoelectronic sensor.

Cameras are used in a variety of ways in industrial applications to automatically detect object properties, for example for the inspection or for the measurement of objects. In this respect, images of the object are recorded and are evaluated in accordance with the task by image processing methods. A particular use of cameras is the reading of codes. Objects with the codes located thereon are recorded with the aid of an image sensor and the code regions are identified in the images and then decoded. Camera-based code readers also cope without problem with different code types than one-dimensional barcodes which also have a two-dimensional structure like a matrix code and provide more information. The automatic detection of the text of printed addresses, (optical character recognition, OCR) or of handwriting is also a reading of codes in principle. Typical areas of use of code readers are supermarket cash registers, automatic parcel identification, sorting of mail shipments, baggage handling at airports, and other logistic applications.

A camera records its images from a field of view. It is necessary for a correct functioning to align the field of view within the application environment. Objects to be detected or codes to be read have to be located in the field of view, for example. It is known to equip the camera with a setup aid or an aiming device for this purpose that make the field of view visible by a reticle or a similar localizable luminous marking.

In a conventional aiming device, light sources that use two spots to mark the center point of the field of view centrally disposed therebetween are arranged to the right and left of the reception path. A central arrangement of a light source is not possible because the light source would there shade a portion of the reception path and would thus proverbially be in the picture. The use of a plurality of sighting beams from different light sources thus required to date requires additional components and the corresponding construction space. In addition, the visualization of the center of the field of view is in particular made more difficult over different distances due to the squinting of the sighting beams. It is possible to project more complex patterns into the field of view by using microlens fields or diffractive optical elements. EP 2 620 894 B1, for example, describes an optoelectronic sensor having an aiming device whose pattern generation element has a microlens field having a plurality of microcylinder lenses. Such pattern generators also have to find space together with the light sources and have to be correspondingly lit so that the construction problems and optical problems are not thereby triggered.

DE 20 2015 100 438 U1 discloses an optoelectronic sensor having an aiming device that has an array of single light sources that can be activated singly or group-wise, with the activation pattern corresponding to the projected light pattern. Very variable light patterns can admittedly thus be generated, but the apparatus effort is only increased and squinting is not prevented.

A camera for the identification of objects using an object illumination and/or positioning illumination is known from EP 2 136 248 A1, with the illumination being coupled to a focus adjustment. In this respect, the concept explained above having two lateral light sources is expanded to a ring of light sources and the solution thus becomes even more complex.

So-called metalenses have been used for some time. They are extremely thin optical elements having a lens effect that have special nanostructures to influence beam paths. WO 2017/053309 A1, for example, uses a metalens for collimation. The paper by Yu, Nanfang, and Federico Capasso, "Flat optics with designer metasurfaces." Nature materials 13.2 (2014): 139-150 likewise deals with this technology. In the paper by Reshef, Orad, et al. "An optic to replace space and its application towards ultra-thin imaging systems", Nature communications 12.1 (2021): 1-8, so-called spaceplates are discussed in addition to metalenses, with the former being directed with similar technologies by the metalenses to the region between the lenses since a plurality of metalenses also first have to observe a distance from one another like classical lenses. The spaceplates should reduce this distance to be able to further reduce the construction depth of an optics. Metalenses are used as a replacement for classical refractive lenses in the previously described applications.

The still unpublished German patent application having the file reference 102021130334.6 combines a visible pilot light beam with an infrared measuring light beam by means of an optical element having at least one optical metasurface. The course of the measuring light beam can thereby be tracked by the naked eye. A use as an aiming device for the visualization of the field of view of a camera is, however, not considered there.

It is therefore the object of the invention to improve the aiming device of an optoelectronic sensor to make its field of view visible.

This object is satisfied by an optoelectronic sensor having an aiming device and by a method for the visualization of the field of view of an optoelectronic sensor in accordance with the respective independent claim. An image sensor records images in its field of vision or field of view and correspondingly detects image data. A reception optics or an objective is preferably arranged in front of the image sensor and it forms a reception path together. An aiming device having a light source in the visible spectrum, for example an LED or a laser, generates alignment light and thus a light pattern in the field of view so that the field of view becomes recognizable for the human eye. To make the position and/or extent of the field of view visible, a center can, for example, be marked, in particular by a reticle and/or border lines or corners. The light source is arranged laterally offset from the image sensor, i.e. in its plane. This offset prevents the light source from shading a relevant portion of the reception path or from being detected in the image data. In this respect, the light source can be arranged, depending on the embodiment, in the plane of the image sensor or perpendicular thereto and thus have a spacing in the direction of view of the camera.

The invention starts from the basic idea of using an optical metaelement to coaxially superpose the optical axes of the image sensor and of the aiming device. The optical axis of the image sensor is that of the reception path and of a reception optics preferably provided there. The optical axis of the aiming device corresponds to its direction of irradiation into the field of view. The function of the optical metaelement is thus to coaxially align the reception path and the projection axis of the aiming device with one another, in other words to place them over one another or to allow them to coincide with one another. This is not initially the case due to the lateral offset of the light source with respect to the image sensor and is only achieved by the optical metaelement.

An optical metaelement is to be understood as an optical element that has a meta surface and/or a metamaterial, i.e. nanostructures that are in particular smaller than the wavelength of the incident light that very directly form certain wavefronts. With a metasurface, such nanostructures are provided at the surface; a metamaterial achieves corresponding properties through the nanostructure of a layer system or of a solid body. The nanostructures allow the phase and/or amplitude, and thus the propagation direction and the polarization, to be changed in a defined manner, and indeed in particular in dependence on the wavelength of the incident light. Metasurfaces are also called "flat optics" since their space requirements in the beam direction are considerably smaller than those of conventional refractive optics. The optical metaelement preferably forms a metalens, i.e. a flat, light permeable carrier material having a metasurface at the front and/or rear sides with a nanostructure that achieves the desired lens properties. A metalens can have a metamaterial instead of a simple carrier material. Optical metaelements are known per se from the technical literature. WO 2017/053309 A1 and the papers of Yu et al. and Reshef et al., which are additionally referenced, were briefly presented by way of example in the introduction.

The invention has the advantage that the alignment light can take the same light path as the received light evaluated by the image sensor, naturally in the opposite direction. No disadvantageous effects therefore occur due to squinting or the like; the light pattern is faithfully located at the correct position corresponding to the field of view in real space. The correct center of the field of view is in particular visualized without problem, with the field of view together with the geometry and extent equally being able to be displayed additionally or alternatively to the further support of the setter depending on the demands. It is possible to dispense with two or more light sources at either side of the image sensor and thereby to save components and construction space that is in particular tight with miniaturized sensors.

The sensor preferably has only one light source. Thanks to the optical metaelement that coaxially superposes the optical axes of the image sensor and of the aiming device, the field of view together with its center can be correctly visualized despite the initially lateral irradiation of the light source arranged laterally offset from the image sensor. An arrangement of a plurality of light sources symmetrical to the optical axis of the image sensor was required for this in the prior art, with not even a squinting having thereby been able to be prevented. The invention can, in contrast, manage with a single light source and nevertheless projects the light pattern exactly in the direction of the field of view. Alternatively, the sensor preferably has a plurality of light sources that form a non-symmetrical arrangement about the optical axis of the image sensor. An example for this is a dual light source on the same side of the image sensor for greater luminous intensity or a light source array arranged laterally offset from the image sensor. it is naturally conceivable in principle also to combine the invention with a symmetrical arrangement of a plurality of light sources about the optical axis of the image sensor; however, then the possibilities of the optical metaelement used in accordance with the invention are only exploited in part.

The light source preferably has an irradiation direction slanted with respect to the optical axis of the image sensor. The slanted irradiation direction preferably guides the alignment light into the optical axis of the image sensor. It is then deflected by the optical metaelement there in the direction of the optical axis of the image sensor and the optical axes of the image sensor and the aiming devices are thus coaxially superposed on one another. The slanted irradiation direction therefore so-to-say corrects the lateral offset of the light source from the image sensor.

In a preferred alternative, the light source has an irradiation direction in parallel with the optical axis of the image sensor, with an optical element being arranged in the optical path of the light source to change the irradiation direction into a slanted alignment. In this embodiment, the alignment light initially has a parallel offset from the optical axis of the image sensor. The optical element then deflects the alignment light into a slanted irradiation direction and preferably guides it into the optical axis of the image sensor. The combination of a light source irradiating in parallel with the optical axis of the image sensor with the optical element functionally corresponds to a light source having a slanted irradiation direction as in the prior paragraph. The alternative can have construction advantages; it can, for example, be simpler to guide the internal light paths through the sensor or to accommodate a light source on a circuit board in parallel with the plane of the image sensor with an irradiation direction perpendicular thereto instead of arranging the light source in a slanted manner. A mirror, a prism, and any other optical element that can deflect a light beam can be considered as the optical element. The optical element is arranged in the optical path of the alignment light initially transmitted in parallel with the optical axis of the image sensor and is thus laterally offset from the reception path so that no consideration has to be taken of any influence of received light.

The optical element is preferably a further optical metaelement. In this embodiment, there are two optical metaelements, with the further optical metaelement taking over the deflection function that has been described in the previous paragraph. The explained optical metaelement in accordance with the invention that coaxially combines the optical axes of the image sensor and the aiming device is arranged thereafter, following the irradiation direction of the alignment light.

The optical element is preferably configured to bundle or collimate the alignment light. The optical element thus has a dual function of deflection into the slanted irradiation direction and of beam shaping of the alignment light. In an embodiment as a further optical metaelement, both the beam deflecting and the beam shaping properties can be implemented by suitable nanostructures. The beam shaping provides that the alignment light has the beam properties for which the coaxially superimposing optical metaelement is designed on the coaxial combination of the optical axes of the image sensor and the aiming device. No light source having special irradiation characteristics or no special transmission optics for the light source are then required, with this naturally being alternatively or additionally conceivable.

The optical metaelement is preferably configured to generate the light pattern. The optical metaelement thus also acts as a pattern generation element in addition to its function of coaxial combination. More complex light patterns such as a bordering of the field of view or a reticle can thereby be designed and thus give the setter additional information on the orientation, geometry, extent, and the like of the field of view. The optical metaelement can likewise have a beam shaping effect so that the light pattern is projected crisply in a distance range that is as large as possible. It is alternatively conceivable to separate the functions of deflection or coaxial combination and the pattern generation and to provide an additional pattern generation element such as a diffractive optical element or an additional optical metaelement or the light sources are already arranged in a suitable pattern, for instance five light sources in the cross.

A reception optics is preferably arranged in front of the image sensor, with the image sensor, reception optics, and the optical metaelement being arranged after one another in this order. The coaxial combination of the optical axes of the image sensor and the aiming device thus only takes place behind the reception optics from the viewpoint of the alignment light. The alignment light accordingly bypasses the reception optics and remains uninfluenced thereby. The order fixed for this embodiment does not preclude there being further optical elements between the image sensor and the reception optics or between the reception optics and the optical metaelement.

The optical metaelement is preferably arranged at a front screen of the sensor, in particular integrated into the front screen. This is a particularly space saving design. An optical metasurface can, for example, be applied at the inside, or also at the outside, at the front screen or the front screen at least partially comprises an optical metamaterial.

A reception optics is preferably arranged in front of the image sensor, with the optical metaelement being arranged between the image sensor and the reception optics. In this alternative embodiment, the order of the optical element and the reception optics is now swapped over. The optical axes of the image sensor and the aiming device are thus already combined in front of the reception optics from the viewpoint of the alignment light. The alignment light penetrates the reception optics that can thus be used for its beam shaping, in particular bundling or collimation. Additional beam shaping optical elements of the aiming device for the alignment light can thereby be dispensed with.

The optical metaelement preferably only has an optical effect in the spectrum of the light source, in particular only in the visible spectrum or only for one color of the light source. Only the alignment light is thus directly deflected or beam shaped or a light pattern formed therewith. Light having wavelengths outside the spectrum of the light source in contrast, and thus all or at least most of the received light is simply transmitted unchanged. This is only possible within the limits of what is technically feasible, but a metasurface or a metamaterial can by all means be designed such that the effect outside a certain spectral band remains negligible. The spectrum of the light source within which the optical metaelement displays an optical effect can be the whole visible spectrum. This is sufficient for the delineation between the alignment light and the received light if the image data are acquired in the non-visible range, for instance recordings in the infrared or ultraviolet range. The light source particularly preferably generates alignment light in only one color, in blue for instance, and indeed preferably combined with the acquisition of image data in a different color, in red for instance. In this context, color can in particular also be understood in the sense of the particularly narrow wavelength range of a laser light source. If there are overlaps in the spectrum of the aiming device and the image sensor, the interaction remains small and acceptable due to a narrow spectrum of action of the optical metaelement. The received light is only influenced a little; the image data are at most slightly changed.

The sensor preferably has an illumination device to illuminate the field of view that in particular generates illumination light in a different spectral range than the alignment light of the light source. This illumination device does not serve the visualization of the field of view, but rather the sufficient illumination for the image recording. The illumination device can be internal or external and illumination light is preferably generated outside the visible spectrum, in particular infrared or ultraviolet illumination light. The optical metaelement can satisfy its different functions by a spectral separation between the illumination light and the alignment light, namely coaxially combining the alignment light with the reception path and, wherever possible, not influencing the illumination light or corresponding returning light at all.

The sensor is preferably configured as a camera based code reader and has a control and evaluation unit for evaluating the image data, for locating code regions, and for reading code information from the code regions. The aiming device makes it possible for a camera based code reader to ideally align its reading field. This is important both for code readers in manual operation and for code readers in a fixed assembly, for instance at a conveyor belt or in a reading tunnel to read all the codes where possible.

The method in accordance with the invention can be further developed in a similar manner and shows similar advantages in so doing. Such advantageous features are described in an exemplary, but not exclusive manner in the subordinate claims dependent on the independent claims.

Figure 2:
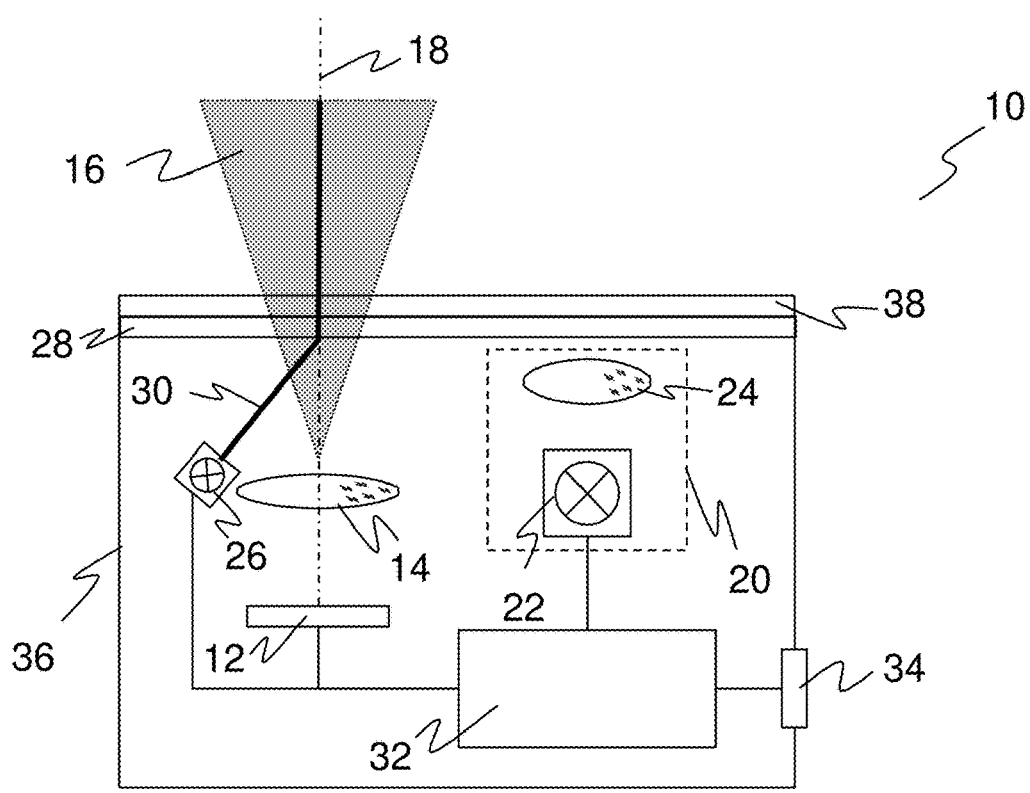
Figure 3:
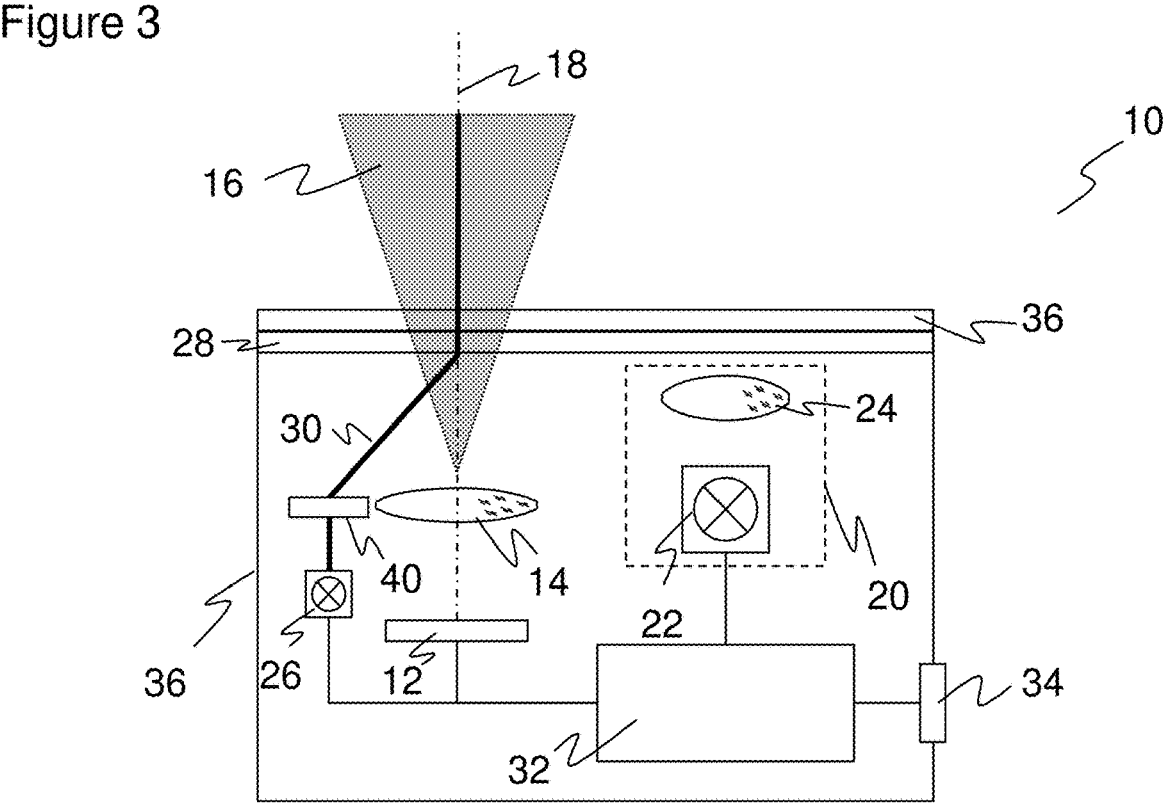
Figure 4:
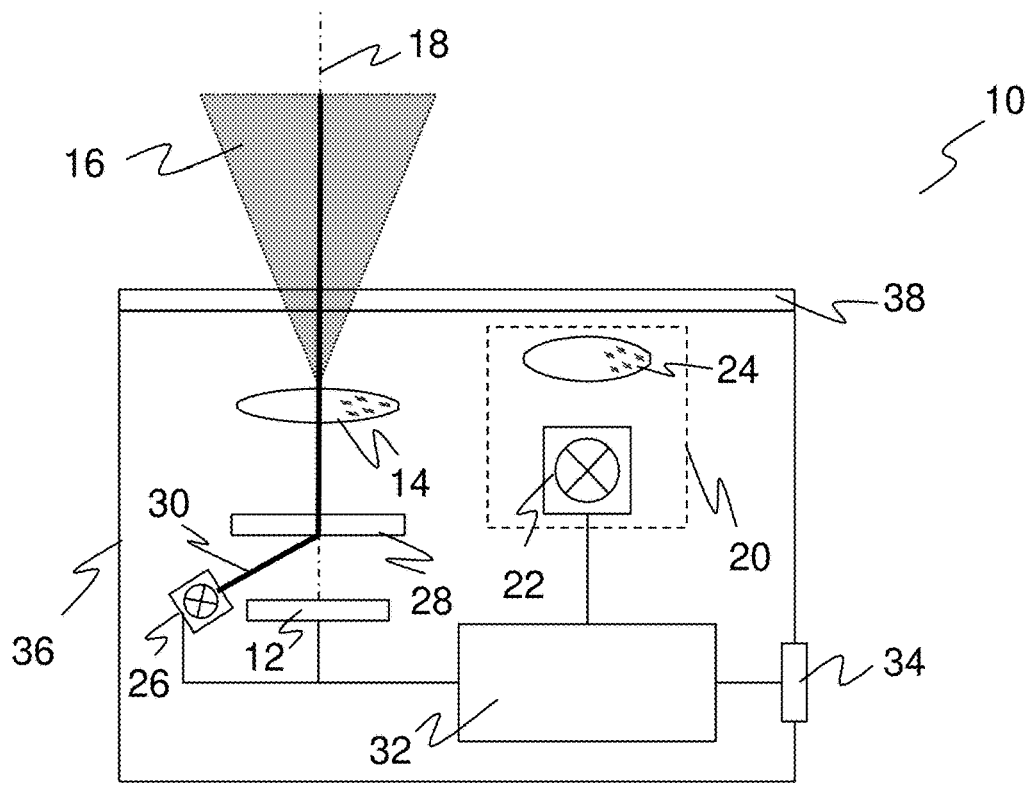
Figure 5:
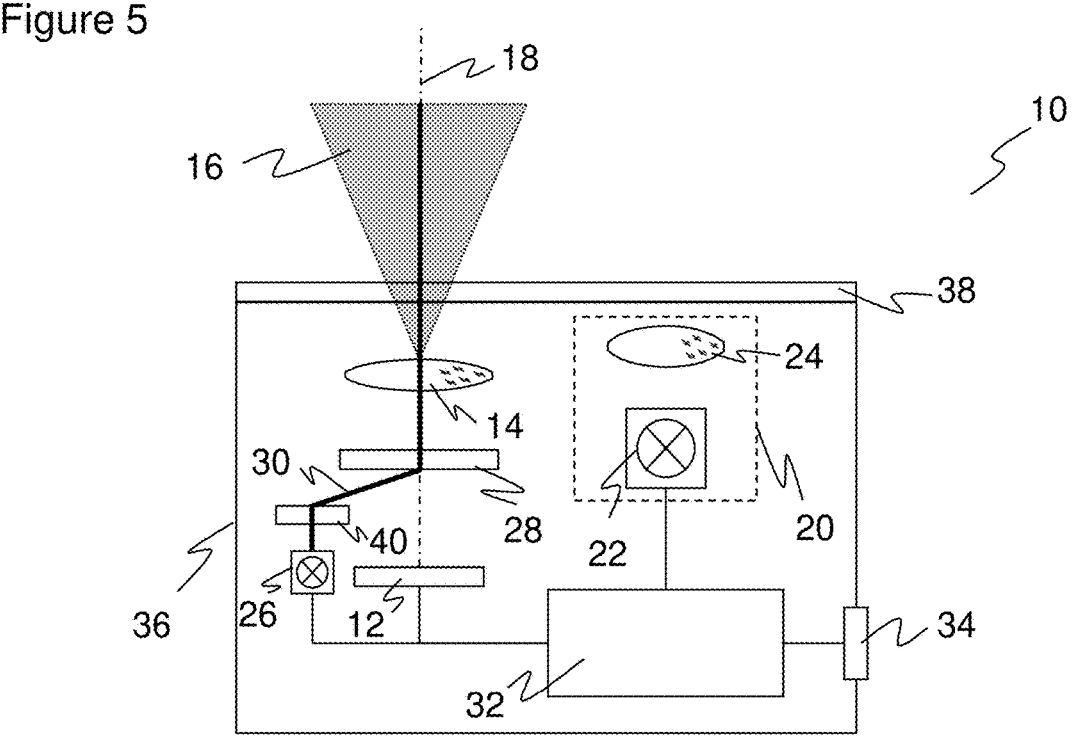
Figure 6:
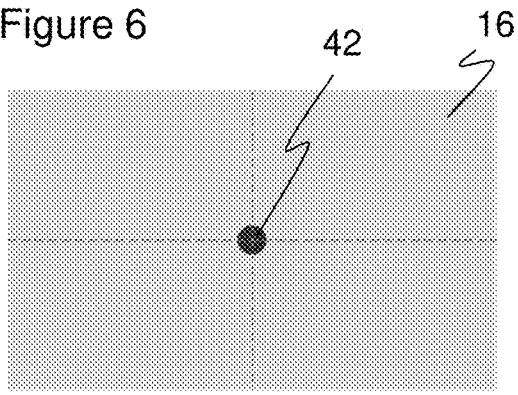
Figure 7:
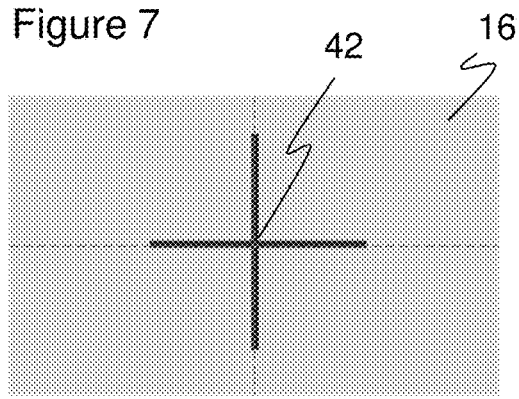
Figure 8:
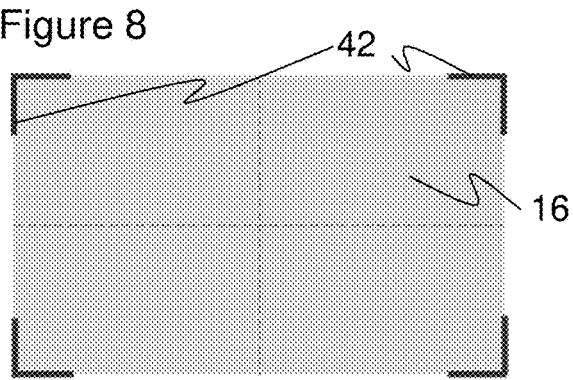
Figure 9:
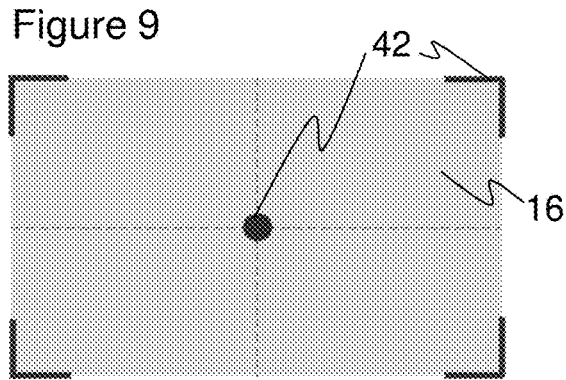

The invention will be explained in more detail in the following also with respect to further features and advantages by way of example with reference to embodiments and to the enclosed drawing. The Figures of the drawing show in:

FIG. 1 a schematic representation of an optoelectronic sensor having an image sensor and of an aiming device whose optical axes are coaxially superposed by means of an optical metaelement;

FIG. 2 a representation similar to FIG. 1, now with an arrangement of the optical metaelement at a front screen;

FIG. 3 a representation similar to FIG. 2, now with an initially parallel instead of slanted irradiation direction of the aiming device;

FIG. 4 a representation similar to FIG. 1, now with a swapped over order of the reception optics and the optical metaelement;

FIG. 5 a representation similar to FIG. 4, now with an initially parallel instead of slanted irradiation direction of the aiming device;

FIG. 6 an exemplary visualization of a field of view by marking the center;

FIG. 7 an exemplary visualization of a field of view by marking the center by a reticle;

FIG. 8 an exemplary visualization of a field of view by marking the corner regions; and FIG. 9 an exemplary visualization of a field of view by marking the center and the corner regions.

FIG. 1 shows a schematic sectional representation of an optoelectronic sensor 10. The sensor 10 has an image sensor 12, for example a CCD or CMOS chip, having a plurality of pixel elements arranged to form a row or a matrix. The sensor 10 is thus in particular a camera. In a preferred embodiment, codes are read; the sensor 10 is then a camera based code reader. A reception optics 14 that is in practice preferably configured as a recording objective is arranged in front of the image sensor 12 and is here only represented by a lens for simplification. The image sensor 12 receives received light from a field of vision or field of view 16 via the reception optics 14, with the objects to be recorded and in particular codes to be read being located in said field of vision or field of view 16. The field of view 16 and an optical axis 18 of the reception path are defined by the configuration and arrangement of the image sensor 12 and the reception optics 14. The field of view 16 and the optical axis 18 of the image sensor 12 are frequently spoken of somewhat imprecisely in this description.

To record images independently of environmental conditions, the sensor 10 preferably has an illumination 20 having a light transmitter 22 that can have a plurality of single light transmitters and preferably has a transmission optics 24. As shown, the illumination 20 can be provided internally, and alternatively externally; its design is possible in every manner known per se. The arrangement of the illumination 20 with respect to the reception path having the image sensor 12 as in FIG. 1 is conceivable, but is primarily to be understood schematically; in practice, light transmitters 22 are, for example, arranged in a circular manner around the reception path. The light transmitter 22 preferably generates illumination light in the non-visible spectrum, in particular infrared or ultraviolet illumination light. An illumination in the visible spectrum such as white, red, blue, or green light is, however, not precluded. The light transmitter can moreover have a narrow band as in the case of an LED or above all of a laser.

The sensor 10 furthermore comprises an aiming device having a light source 26, for instance a semiconductor light source such as an LED, a laser diode, or a VCSEL, in the visible spectrum and an optical metaelement 28. The light source 26 is arranged laterally offset from the image sensor 12, that is it has a distance from the optical axis 18 of the image sensor 12. The light source 26 can also, as shown, have a distance in the direction of the optical axis 18 or it is in the plane of the image sensor 12 in a variation. In a preferred embodiment, a single light source 26 is sufficient, but a plurality of light sources 26 are also conceivable. They are then preferably arranged in a non-symmetrical manner with respect to the image sensor 12; the alignment light 30 is thus initially not centered with respect to the optical axis 18.

The light source 26 first radiates its alignment light 30 with a slanted irradiation direction with respect to the optical axis 18. The alignment light 30 is incident on the optical axis 18 and here on the optical metaelement 28 due to the slanted position. The optical metaelement 28 is designed such that it provides for a deflection onto the optical axis 18 in the spectrum of the alignment light 30. The irradiation direction is therefore aligned with the optical axis 18 and thus with the direction of incidence of the received light. In other words, the optical axis of the aiming device and the optical axis 18 of the image sensor 12 or of the reception path are coaxially superposed or combined.

A light pattern that displays or visualizes in real space the position of the field of view 16 for a human observer such as the setter of the sensor 10 is generated by the alignment light 30 in the field of view 16 by the aiming device. The sensor can thus be simply oriented on a scene or on objects or codes to be recorded. Thanks to the coaxial superposition of the aiming device and the reception path, the light pattern indicates the correct relationship with the field of view 16 in real space. The light pattern can be simple or complex; examples will be explained later with reference to FIGS. 6 to 9. The optical metaelement 28 can be configured for the pattern generation in addition to its deflection function or a separate pattern generation element, not shown, is responsible therefor or the light pattern only consists of one or a few light spots that are directly generated by the light source 26.

The optical metaelement 28 has a metasurface and is in particular structured as a metalens ("flat optics"). It is alternatively or additionally conceivable that the body or carrier of the optical metaelement 22 already comprises a metamaterial. Conventional optical components such as lenses, waveplates, or holograms are based on light propagation over distances that are much larger than the wavelength of the incident light to form wavefronts. In this way, substantial changes of the amplitude, phase, or polarization of light waves are gradually accumulated along the optical path. A metasurface in contrast has structures that can be understood as miniature anisotropic light scatterers or resonators or optical antennas. These structures have dimensions and distances in the nanometer range, much smaller than the wavelength of the incident light. The metasurface thereby shapes in accordance with the Huygens principle optical wavefronts in any desired forms having sub-wavelength resolution in that the nanostructures introduce spatial variations in the optical response of the light scatterers. Effects of a conventional lens can thus be modeled, but also functionalities of other optical components such as beam deflection elements, beam splitters, polarizers, or diffraction grids. The special feature is the high flexibility of reaching a desired starting wavefront and thus the most varied optical effects through adapted nanostructures. Depending on the wavelength range, materials having a suitable transmission behavior are used, for example titanium dioxide, silicon nitride or gallium phosphide in the visible spectral range and aluminum nitride in the ultraviolet spectral range, and chalcogenide alloys in the medium and silicon in the longwave infrared range. These considerations with respect to a metasurface can be transferred to a metamaterial in which the interior or the carrier has corresponding nanostructures, with it being able to be combined with a metasurface. The optical metaelement 28 can consequently have a metastructure or nanostructure in the interior and/or on the front side and/or rear side. Reference is again made to the technical literature and in particular to the initially named WO 2017/053309 A1 and to the papers of Yu et al. and Reshef at al. for properties of an optical metaelement 28 known per se.

In accordance with the invention, the desired function of the optical metaelement 28 is primarily a deflection for the coaxial superposition of the aiming device and the reception path, optionally with an additional pattern generation and/or beam shaping, bundling, or collimation. The optical metaelement preferably only acts directly in the spectrum of the light source 26 and thus only on the alignment light 30, but not on the illumination light of the light transmitter 22 of the illumination 20 or the received light. The optical metaelement 28 is thus practically invisible in the reception path. A spectral separation is, for example, possible when the image sensor 12 records in the non-visible spectrum and the illumination 20 accordingly generates infrared or ultraviolet illumination light, for example. A separation in the visible range is also conceivable; for example blue alignment light 30 with red illumination light or a red image recording.

If spectral superposition cannot be avoided, it is advantageous to use a particularly tight band light source 26, in particular a laser light source, and to coordinate the optical metaelement 28 therewith. The received light is then only minimally influenced and it is furthermore conceivable to arrange, in front of the image sensor 12, a corresponding optical filters, by which light in the spectrum of the alignment light 30 is filtered. Combinations with closely spaced wavelengths thus also become possible. The illumination 20 can, for example, use a white LED or a near-infrared light source as the light transmitter 22 and the aiming device can use a red light source 26, in particular a corresponding laser. Since the aiming device is as a rule operated with deactivated illumination 20, the visibility of the light pattern is not problematic. Even with an activated illumination 20, the light pattern can be sufficiently delineated with a sufficient intensity of illumination of the light source 26 in its spectrum.

The sensor 10 furthermore has a control and evaluation unit 32. The illumination and the light source 26 of the aiming device are controlled and the image data of the image sensor 12 read thereby. In an embodiment of the sensor 10 as a camera based code reader, code regions are looked for in the image data and the code information within code regions is decoded. Image data, results of an evaluation such as code information, and the like are provided at an interface 34. Image data can be output in different pre-processing stages and the total evaluation or a portion of the evaluation is outsourced to external.

The sensor 10 is protected by a housing 36 that is at least partially closed by a transparent front screen 38 at one side in a number of embodiments.

FIGS. 2 to 5 show further embodiments of the invention that differ from the embodiment described in FIG. 1 by their coupling scenarios, that is the respective arrangement and design of the light source 26 and of the metaelement 28 to guide the alignment light 30 onto the optical axis 18 and thus to achieve the coaxial superposition of the optical axis 18 of the reception path and of the optical axis of the aiming device. In the following the differences will primarily be described and in so doing the already known features and properties will be provided with the same reference numerals.

FIG. 2 shows an embodiment in which the coupling of the alignment light 30 to the optical axis 18 takes place at the front screen 38. For this purpose, the optical metaelement 28 is arranged internally or externally at the front screen 38 or is integrated in the front screen 38. The irradiation direction of the light source 26 and in particular its slanted position is correspondingly adapted to aim at the changed position of the optical metaelement 28. The combination of the optical metaelement 28 and the front screen 38 reduces the number of components and takes up less construction space.

FIG. 3 shows an embodiment in which the optical metaelement 28 for the coaxial superposition of the alignment light 30 on the optical axis 18 is arranged at the front screen 38 or is integrated in the front screen 38. In addition, the irradiation direction of the light source 26 is now no longer slanted, but rather in parallel with the optical axis 18. A further optical element 40 for deflection is provided to guide the alignment light 30 at the level of the optical metaelement 28 to the optical axis 18. The combination of the light source 26 aligned in parallel with the further optical element 40 thus effectively effects the same irradiation direction as a previously described slanted positioning of the light source 26.

The further optical element 40 can be any deflection element such as a mirror or a prism. Due to the lateral offset of the light source 26 from the image sensor 12, the further optical element 40 is outside the field of view 16 so that no special properties are required with respect to the transparency in the spectrum of the illumination 20 or of the received light. The further optical element 40 is preferably a further optical metaelement that provides the desired deflection in the spectrum of the alignment light 30. The further optical element 40 is particularly preferably configured for a beam shaping of the alignment light 30, in particular for its collimation. In an embodiment as a further optical metaelement a phase curvature adapted to the desired imaging properties can simultaneously be generated by its nanostructures in addition to a linear phase for the beam deflection. With such a dual function of the further optical element 40, a divergent light source 26 can be used or a separate beam shaping or collimation optics for the light source 26 can be dispensed with. Deviating from FIG. 3, the optical metaelement 28 could, as in FIG. 1, be provided singly instead of at the front screen 38.

FIG. 4 shows an embodiment in which the positions of the reception optics 14 and the optical metaelement 28 are swapped over with respect to the previous embodiments. While the alignment light 30 has previously bypassed the reception optics 14, it passes through the reception optics 14 in the embodiment in accordance with FIG. 4. The reception optics 14 can thus also be used by the aiming device to beam shape or collimate the alignment light 30. The optical metaelement 28 can supplement the beam shaping properties of the reception optics 14 for the alignment light 30, that is can introduce a suitable phase curvature by a linear phase in addition to a simple deflection. In a further embodiment, the optical metaelement 28 is integrated in the reception optics 28, for example as a metasurface of a lens. In an embodiment in accordance with FIG. 4, the light source 26 is, as in FIGS. 1 and 2, arranged at an angle or slanted to aim at the optical metaelement 28 where the alignment light 30 is then coaxially superposed with the optical axis 18 before it reaches the reception optics 14.

FIG. 5 shows an embodiment similar to FIG. 4, that is already with a coaxial superposition in front of the reception optics 14, with the light source 26 now no longer being slanted, but, as in FIG. 3, irradiating in parallel with the optical axis 18. As explained with reference to FIG. 3, a further optical element 40 is provided that deflects the alignment light 30 onto the optical metaelement 28. The further optical element 40 is preferably a further optical metaelement.

FIGS. 6 to 9 show some exemplary light patterns 42 that can be generated by the aiming device with the light source 26 and the optical metaelement 28. A very simple visualization is illustrated in FIG. 6 in which a dot or spot is projected into the center of the field of view 16 as a light pattern 42. The center of the field of view 16 is thereby marked and thus a particularly important alignment aid provided.

In FIG. 7, an additional structure is also added to the alignment light 30 for marking the center, preferably by the optical metaelement 28 itself; alternatively by an additional pattern element or a corresponding arrangement of light sources 26. A reticle is particularly helpful as a light pattern 42 by which the center and the main directions of the field of view 16 can be made easily recognizable. Any desired other pattern can be projected instead of a reticle.

In FIG. 8, the geometry and extent of the field of view 16 is visualized in total by the light pattern 42. No image of the image sensor 12 is then required to correctly align the field of view 16 or the sensor 10 overall. The light pattern 42 and its representation of the field of view 16 scales correctly with the imaging scale of the reception optics 14 over the total distance range of the sensor 10 thanks to the coaxial superposition. The reception optics 14 can also be used for this true-to-size representation of the field of view 16, as explained with reference to FIGS. 4 and 5; alternatively, the optical metaelement 28 can be used to project the light pattern 42 in the correct size. The outer borders of the field of view 16 are indicated by corner markings in FIG. 8; any other patterns are also conceivable here.

FIG. 9 illustrates a combination in which, as in FIG. 6, both the center of the field of view 16, and as in FIG. 8, its extent is visualized. The individual pattern elements can have different designs, for example in each case as a reticle and any desired patterns that make the important properties of the field of view 16 visible can be generated generally differently.

The invention claimed is:

1. An optoelectronic sensor, the optoelectronic sensor comprising:
    an image sensor for the detection of image data in a field of view and an aiming device having a light source, the light source being arranged laterally offset from the image sensor and the light source being configured to generate alignment light and thus a light pattern in the field of view to make the position and/or extent of the field of view in space visible,
    wherein the aiming device has at least one optical metaelement having at least one of a metasurface and a metamaterial that is arranged and configured such that the optical axes of the image sensor and of the aiming device are coaxially superposed.

2. The optoelectronic sensor in accordance with claim 1, wherein the optoelectronic sensor is a camera.

3. The optoelectronic sensor in accordance with claim 1 that only has one of one light source and a plurality of light sources that form a non-symmetrical arrangement about the optical axis of the image sensor.

4. The optoelectronic sensor in accordance with claim 1, wherein the light source has an irradiation direction slanted with respect to the optical axis of the image sensor.

5. The optoelectronic sensor in accordance with claim 1, wherein the light source has an irradiation direction in parallel with the optical axis of the image sensor; and
    wherein an optical element is arranged in the optical path of the light source to change the irradiation direction into a slanted alignment.

6. The optoelectronic sensor in accordance with claim 5, wherein the optical element is a further optical metaelement.

7. The optoelectronic sensor in accordance with claim 5, wherein the optical element is configured to bundle or collimate the alignment light.

8. The optoelectronic sensor in accordance with claim 1, wherein the optical metaelement is configured to generate the light pattern.

9. The optoelectronic sensor in accordance with claim 1, wherein a reception optics is arranged in front of the image sensor; and
    wherein the image sensor, the reception optics, and the optical metaelement are arranged behind one another in this order.

10. The optoelectronic sensor in accordance with claim 1, wherein the optical metaelement is arranged at a front screen of the optoelectronic sensor.

11. The optoelectronic sensor in accordance with claim 10, wherein the optical metaelement is integrated in the front screen.

12. The optoelectronic sensor in accordance with claim 1, wherein a reception optics is arranged in front of the image sensor; and
    wherein the optical metaelement is arranged between the image sensor and the reception optics.

13. The optoelectronic sensor in accordance with claim 1, wherein the optical metaelement only has an optical effect in the spectrum of the light source.

14. The optoelectronic sensor in accordance with claim 13, wherein the optical metaelement only has an optical effect only in the visible spectrum or only for one color of the light source.

15. The optoelectronic sensor in accordance with claim 1, that has an illumination device to illuminate the field of view.

16. The optoelectronic sensor in accordance with claim 15, wherein the illumination device is configured to generate illumination light in a different spectral range than the alignment light of the light source.

17. The optoelectronic sensor in accordance with claim 1, that is configured as a camera based code reader and has a control and evaluation unit for evaluating the image data, for locating code regions, and for reading code information from the code regions.

18. A method of visualizing a field of view of an optoelectronic sensor that detects image data from the field of view by an image sensor and that irradiates alignment light by means of an aiming device by a light source arranged laterally offset from the image sensor and thus generates a light pattern in the field of view to make the position and/or extent of the field of view in space visible,
    wherein the aiming device has at least one optical metaelement having a metasurface and/or a metamaterial that coaxially superposes the optical axes of the image sensor and the aiming device.

19. The method in accordance with claim 18, wherein the optoelectronic sensor comprises the image sensor for the detection of image data in the field of view and the aiming device having the light source, the light source being configured to generate alignment light and thus the light pattern in the field of view to make the position and/or extent of the field of view in space visible,
    wherein the at least one optical metaelement of the aiming device is arranged and configured such that the optical axes of the image sensor and of the aiming device are coaxially superposed.

* * * * *